United States Patent
Ochi et al.

(10) Patent No.: US 11,100,382 B2
(45) Date of Patent: Aug. 24, 2021

(54) CARD-TYPE WIRELESS COMMUNICATION DEVICE

(71) Applicant: Murata Manufacturing Co., Ltd., Nagaokakyo (JP)

(72) Inventors: Tatsuya Ochi, Nagaokakyo (JP); Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/817,821

(22) Filed: Mar. 13, 2020

(65) Prior Publication Data

US 2020/0210803 A1 Jul. 2, 2020

Related U.S. Application Data

(63) Continuation of application No. PCT/JP2018/027906, filed on Jul. 25, 2018.

(30) Foreign Application Priority Data

Oct. 20, 2017 (JP) .............................. JP2017-203429

(51) Int. Cl.
*G06K 19/077* (2006.01)
*H01Q 1/22* (2006.01)
*H01Q 9/28* (2006.01)

(52) U.S. Cl.
CPC . *G06K 19/07786* (2013.01); *G06K 19/07767* (2013.01); *G06K 19/07775* (2013.01);
(Continued)

(58) Field of Classification Search
None
See application file for complete search history.

(56) References Cited

U.S. PATENT DOCUMENTS 5,491,483 A * 2/1996 D'Hont ................. B65F 1/1484
342/42
5,572,226 A 11/1996 Tuttle
(Continued)

FOREIGN PATENT DOCUMENTS

JP 2009043167 A 2/2009
JP 2009288874 A 12/2009
(Continued)

OTHER PUBLICATIONS

International Search Report issued for PCT/JP2018/027906, dated Oct. 2, 2018.
(Continued)

*Primary Examiner* — Curtis J King
(74) *Attorney, Agent, or Firm* — Arent Fox LLP

(57) ABSTRACT

A card-type wireless communication device is provided that suppresses a deterioration in communication performance of the dipole antenna while ensuring a larger coil antenna size in a limited card size. The card-type wireless communication device includes a coil antenna and a dipole antenna. The dipole antenna includes first dipole element including a first connection end connected to a second-frequency-band RFIC element, first linear part that extends from the first connection end along an outer edge of the coil antenna, and a first open end facing the outer edge of the coil antenna via the first linear part. Moreover, a second dipole element includes a second connection end connected to second-frequency-band RFIC element, and a second open end at a position farther from the outer edge of the coil antenna than a shortest distance between the first linear part and the outer edge of the coil antenna.

20 Claims, 13 Drawing Sheets

(52) U.S. Cl.
CPC ......... G06K 19/07783 (2013.01); H01Q 1/22 (2013.01); H01Q 9/285 (2013.01)

(56) References Cited

U.S. PATENT DOCUMENTS

| | | | |
|---|---|---|---|
| 5,594,448 A * | 1/1997 | d'Hont | G01S 3/30 340/935 |
| 5,621,913 A | 4/1997 | Tuttle | |
| 5,719,586 A | 2/1998 | Tuttle | |
| 5,787,174 A | 7/1998 | Tuttle | |
| 6,144,916 A | 11/2000 | Wood, Jr. et al. | |
| 6,933,898 B2 * | 8/2005 | Nantz | B60C 23/0416 343/711 |
| 7,503,491 B2 * | 3/2009 | Zhu | G06K 19/07749 235/451 |
| 7,659,857 B2 * | 2/2010 | King | H01Q 9/16 343/702 |
| 8,058,998 B2 * | 11/2011 | Burnside | H01Q 1/2216 340/572.7 |
| 8,169,322 B1 * | 5/2012 | Zhan | G06K 19/07749 340/572.7 |
| 8,289,166 B2 | 10/2012 | Fujishiro et al. | |
| 9,077,067 B2 | 7/2015 | Ikemoto | |
| 9,171,244 B2 * | 10/2015 | Endou | G06K 19/07754 |
| 9,785,877 B1 * | 10/2017 | Fink | G06K 19/0775 |
| 9,960,814 B2 | 5/2018 | Nagai | |
| 10,055,619 B2 * | 8/2018 | Finke | H01Q 7/00 |
| 10,929,835 B2 * | 2/2021 | Nyalamadugu | G06Q 20/342 |
| 2004/0233042 A1 | 11/2004 | Piccoli et al. | |
| 2005/0179529 A1 * | 8/2005 | Sato | B60C 23/0433 340/445 |
| 2006/0196949 A1 * | 9/2006 | Ando | G06K 19/07749 235/492 |
| 2007/0096891 A1 * | 5/2007 | Sheriff | B60N 2/002 340/457.1 |
| 2007/0262871 A1 * | 11/2007 | Yamagajo | G06K 19/07771 340/572.7 |
| 2008/0036608 A1 * | 2/2008 | Sakama | G06K 19/07771 340/572.7 |
| 2008/0062066 A1 * | 3/2008 | Arai | H01Q 21/29 343/867 |
| 2008/0111760 A1 * | 5/2008 | Sakama | G06K 19/07745 343/860 |
| 2009/0160717 A1 * | 6/2009 | Tsutsumi | H01Q 7/00 343/726 |
| 2009/0315680 A1 * | 12/2009 | Arimura | G06K 19/07781 340/10.1 |
| 2010/0134293 A1 | 6/2010 | Fujishiro et al. | |
| 2010/0265041 A1 * | 10/2010 | Almog | H01Q 1/2225 340/10.1 |
| 2011/0063184 A1 * | 3/2011 | Furumura | H01Q 1/2208 343/856 |
| 2011/0090058 A1 | 4/2011 | Ikemoto | |
| 2012/0086556 A1 * | 4/2012 | Ikemoto | G06K 19/07779 340/10.1 |
| 2012/0098664 A1 * | 4/2012 | Nordin | G06Q 10/087 340/572.1 |
| 2013/0221113 A1 * | 8/2013 | Carr | H01Q 9/16 235/492 |
| 2015/0080066 A1 * | 3/2015 | Chen | H01Q 5/378 455/575.7 |
| 2015/0116090 A1 * | 4/2015 | Proehl | H01F 27/36 340/10.1 |
| 2016/0142866 A1 * | 5/2016 | Jang | H02J 50/70 455/41.1 |
| 2016/0181696 A1 * | 6/2016 | Rizzo | H01Q 1/38 343/702 |
| 2016/0241306 A1 * | 8/2016 | Moon | H01Q 1/2208 |
| 2017/0005391 A1 * | 1/2017 | Tenno | G06K 19/07794 |
| 2017/0195009 A1 | 7/2017 | Nagai | |
| 2017/0364718 A1 * | 12/2017 | Finke | G06K 7/10336 |

FOREIGN PATENT DOCUMENTS

| | | |
|---|---|---|
| JP | 2010130457 A | 6/2010 |
| JP | 2010239650 A | 10/2010 |
| JP | 2012134656 A | 7/2012 |
| JP | 2015087948 A | 5/2015 |
| JP | 2017034686 A | 2/2017 |

OTHER PUBLICATIONS

Written Opinion of the International Searching Authority issued for PCT/JP2018/027906, dated Oct. 2, 2018.

* cited by examiner

US 11,100,382 B2

CARD-TYPE WIRELESS COMMUNICATION DEVICE

CROSS REFERENCE TO RELATED APPLICATIONS

The present application is a continuation of PCT/JP2018/027906 filed Jul. 25, 2018, which claims priority to Japanese Patent Application No. 2017-203429, filed Oct. 20, 2017, the entire contents of each of which are incorporated herein by reference.

TECHNICAL FIELD

The present invention relates to a card-type wireless communication device configured for transmitting and receiving signals in different frequency bands.

BACKGROUND

Currently, an exemplary device described in Patent Document 1 (identified below) is conventionally known as a card-type wireless communication device. Specifically, Patent Document 1 describes a card-type wireless communication device compatible with both an RFID (radio frequency identification) system using a signal in the HF band and an RFID system using a signal in the UHF band.

Patent Document 1: Japanese Laid-Open Patent Publication No. 2015-87948.

However, a conventional wireless communication device has a problem that when a coil antenna transmitting/receiving a signal in the HF band is arranged close to a dipole antenna transmitting/receiving a signal in the UHF band, communication performance deteriorates particularly in the dipole antenna due to mutual interference.

In this regard, Patent Document 1 describes a configuration in which relative sizes of a coil antenna and a dipole antenna is regulated to suppress a deterioration in communication performance of the dipole antenna.

However, the configuration of Patent Document 1 results in tight restriction on the size of the coil antenna. Therefore, for example, when the size of the wireless communication device is set to a size conforming to the international standard defined for IC cards, the configuration of Patent Document 1 makes it difficult to increase the size of the coil antenna to a readable level for a normal reader device.

SUMMARY OF THE INVENTION

Accordingly, it is an object of the present invention to solve the problem described above and provide a card-type wireless communication device configured to suppress a deterioration in communication performance of a dipole antenna while ensuring a larger coil antenna size in a limited card size.

Thus, according to an exemplary embodiment, a card-type wireless communication device is provided that includes a support base material; a coil antenna disposed on the support base material and configured for transmitting and receiving signals in a first frequency band; a first-frequency-band RFIC element connected to the coil antenna; a dipole antenna disposed on the support base material outside the coil antenna and configured for transmitting and receiving signals in a second frequency band higher than the first frequency band; and a second-frequency-band RFIC element connected to the dipole antenna. Moreover, the dipole antenna includes a first dipole element including a first connection end connected to the second-frequency-band RFIC element, a first linear part that extends from the first connection end along an outer edge of the coil antenna, and a first open end facing the outer edge of the coil antenna via the first linear part in planar view, and a second dipole element including a second connection end connected to the second-frequency-band RFIC element, and a second open end arranged at a position farther from the outer edge of the coil antenna than a shortest distance between the first linear part and the outer edge of the coil antenna.

The card-type wireless communication device according to this embodiment is configured to suppress a deterioration in communication performance of the dipole antenna while ensuring a larger coil antenna size in a limited card size.

DETAILED DESCRIPTION OF EXEMPLARY EMBODIMENTS

Figure 1:
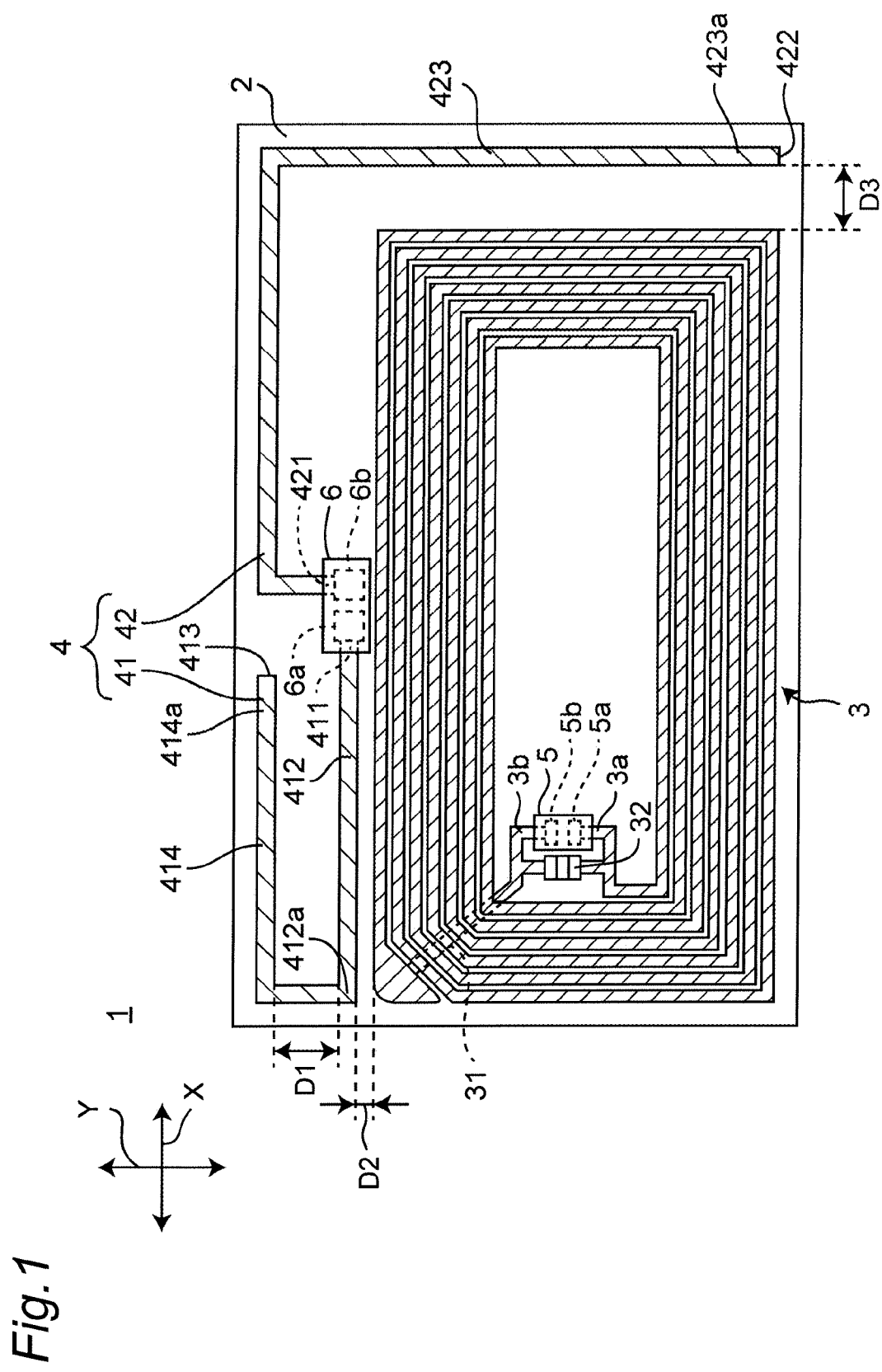
FIG. 1 is a plan view showing a configuration of an IC card serving as a wireless communication device according to an exemplary embodiment.

In general, the current invention considers the suppressing of deterioration in communication performance of a dipole antenna while ensuring a larger coil antenna size in a limited card size.

In the dipole antenna, a portion on an open end side of a dipole element mainly contributes to signal transmission/reception, while a portion on a connection end side of the dipole element connected to a radio-frequency integrated circuit ("RFIC") element hardly contributes to signal transmission/reception. Therefore, even if the portion (i.e., the linear part) on the connection end side of the dipole element is disposed close to an outer edge of the coil antenna, the communication performance of the dipole antenna is less affected. Additionally, by interposing the portion on the connection end side of the dipole element between the open end of the dipole element and the outer edge of the coil antenna in planar view, interference by the coil antenna can further be suppressed. In view of the foregoing considerations, the exemplary embodiments of the present invention are provided as follows.

Specifically, a card-type wireless communication device according to an exemplary aspect includes a support base material; a coil antenna disposed on the support base material and configured for transmitting and receiving signals in a first frequency band; a first-frequency-band RFIC element connected to the coil antenna; a dipole antenna disposed on the support base material outside the coil antenna and configured for transmitting and receiving signals in a second frequency band higher than the first frequency band; and a second-frequency-band RFIC element connected to the dipole antenna. Moreover, the dipole antenna includes a first dipole element including a first connection end connected to the second-frequency-band RFIC element, a first linear part extending from the first connection end along an outer edge of the coil antenna, and a first open end facing the outer edge of the coil antenna via the first linear part in planar view, and a second dipole element including a second connection end connected to the second-frequency-band RFIC element, and a second open end arranged at a position farther from the outer edge of the coil antenna than a shortest distance between the first linear part and the outer edge of the coil antenna.

According to this configuration, since the first open end is arranged at a position facing the outer edge of the coil antenna via the first linear part in planar view, interference with the first dipole element by the coil antenna is suppressed. Therefore, the first dipole element can entirely be arranged closer to the outer edge of the coil antenna. Since the second open end is arranged at a position farther from the outer edge of the coil antenna than the shortest distance between the first linear part and the outer edge of the coil antenna, interference with the second dipole element by the coil antenna can also be suppressed. As a result, a deterioration in the communication performance of the dipole antenna is suppressed while a larger size of the coil antenna is ensured in a limited card size.

Moreover, a shortest distance between the first open end and the first linear part may be larger than the shortest distance between the first linear part and the outer edge of the coil antenna. According to this configuration, the interference with the first dipole element by the coil antenna can further be suppressed.

In an exemplary aspect, the first dipole element may have a first open end side portion extending from the first open end in an X direction, and the second dipole element may have a second open end side portion extending from the second open end in a Y direction. According to this configuration, a range of signal transmission/reception by the dipole antenna can be expanded.

Moreover, an exterior member may further be included to cover and prevent the coil antenna and the dipole antenna from being exposed to the outside and has a display surface on which vertically oriented information is displayed, the second-frequency-band RFIC element may be arranged at a position corresponding to an upper region of the display surface, and the coil antenna may be arranged at a position corresponding to a region lower than the upper region of the display surface. According to this configuration, signals in the UHF band can more reliably be transmitted and received between a reader device usually arranged above a user such as on a ceiling and the dipole antenna while the interference by the coil antenna is suppressed.

In the first dipole element, a portion forming $1/10$ or more of the entire length of the first dipole element from the first open end can be arranged at a position facing the outer edge of the coil antenna via the first linear part in planar view. According to this configuration, a wider portion on the open end side mainly contributing to signal transmission/reception is arranged at a position facing the outer edge of the coil antenna via the first linear part, so that the interference by the coil antenna can further be suppressed.

In the first dipole element, a portion forming $1/4$ or more of the entire length of the first dipole element from the first open end can be arranged at a position facing the outer edge of the coil antenna via the first linear part in planar view. According to this configuration, a wider portion on the open end side mainly contributing to signal transmission/reception is arranged at a position facing the outer edge of the coil antenna via the first linear part, so that the interference by the coil antenna can further be suppressed.

In addition, the second dipole element can have a second linear part arranged to extend from the second connection end along the outer edge of the coil antenna, and the second open end can be arranged at a position facing the outer edge of the coil antenna via the second linear part in planar view. According to this configuration, the interference with the second dipole element by the coil antenna can further be suppressed, and the second dipole element can entirely be arranged closer to the outer edge of the coil antenna.

In an exemplary aspect, the first frequency band can be an HF band, and the second frequency band can be a UHF band.

An exemplary embodiment of a card-type wireless communication device will now be described with reference to the drawings.

FIG. 1 is a plan view showing a configuration of an IC card that is an example of a card-type wireless communication device according to an exemplary embodiment.

As shown, an IC card 1 according to this embodiment is a non-contact IC card configured for transmitting and receiving a signal in the HF band that is an example of a first frequency band and a signal in the UHF band that is an example of a second frequency band higher than the first frequency band. Therefore, the IC card 1 is a non-contact IC card corresponding to both an RFID system using a signal in the HF band and an RFID system using a signal in the UHF band.

The IC card 1 includes a support base material 2, and a coil antenna 3 and a dipole antenna 4 disposed on the support base material 2.

In this embodiment, the support base material 2 is a rectangular base material having a size conforming to the international standard (ISO/IEC 7810) defined for IC cards such as credit cards and cash cards. For example, the support base material 2 has a vertical dimension of 53.98 mm, a horizontal dimension of 85.60 mm, and a thickness of 0.76 mm. The support base material 2 is made up of a flexible film-shaped member of polyethylene terephthalate (PET) etc.

The coil antenna 3 is an antenna configured for transmitting and receiving signals in the HF band (e.g., 13.56 MHz). In this embodiment, as shown in FIG. 1, the coil antenna 3 is a planar coil formed by winding a conductor wire in multiple turns into a rectangular spiral shape. For example, the coil antenna 3 is patterned with copper foil, aluminum foil, or silver paste.

An HF-band RFIC element 5 is an example of a first-frequency-band RFIC element and is connected to the coil antenna 3. More specifically, a first input/output terminal 5a of the HF-band RFIC element 5 is connected to one end 3a of the coil antenna 3 and a second input/output terminal 5b of the HF-band RFIC element 5 is connected via a bridge conductor 31 to the other end 3b of the coil antenna 3. As used herein, the term "connected" refers not only to direct connection but also to indirect (e.g., electric) connection through electrostatic capacity or electromagnetic coupling, for example.

A capacitor element 32 is connected in parallel to the coil antenna 3. The coil antenna 3 and the capacitor element 32 form an antenna resonance circuit. Magnetic field coupling between this antenna resonance circuit and a coil antenna (not shown) of an external device enables reception of electric power with low loss. The capacitance of the capacitor element 32 is determined such that the resonance frequency of the antenna resonance circuit is a frequency in the HF band. The capacitor element 32 is not limited to a chip-shaped component and may be made up of a parasitic capacitance between conductor wires formed on both principal surfaces of the support base material 2, for example.

The dipole antenna 4 is an antenna that is configured for transmitting and receiving signals in the UHF band (e.g., 920 MHz). As shown in FIG. 1, the dipole antenna 4 is disposed outside the coil antenna 3 on the support base material 2. A UHF-band RFIC element 6 is an example of a second-frequency-band RFIC element and is connected to the dipole antenna 4. The UHF-band RFIC element 6 is arranged near an outer edge, i.e., an outermost turn, of the coil antenna 3. A configuration example of the UHF-band RFIC element 6 will be described later in detail.

The dipole antenna 4 includes a first dipole element 41 and a second dipole element 42. In this embodiment, the first dipole element 41 is made up of a single substantially U-shaped conductor wire. The second dipole element 42 is made up of a single substantially L-shaped conductor wire. Moreover, the width of each of the conductor wires is 100 µm or less, for example. For example, the first dipole element 41 and the second dipole element 42 are patterned with copper foil, aluminum foil, or silver paste.

The first dipole element 41 includes a first connection end 411, a first linear part 412, and a first open end 413.

The first connection end 411 is a portion connected to a first input/output terminal 6a of the UHF-band RFIC element 6.

The first linear part 412 is a portion arranged to extend from the first connection end 411 along the outer edge of the coil antenna 3. In this embodiment, the first linear part 412 is disposed to extend in an X direction parallel to the upper outer edge of the coil antenna 3. An end part 412a of the first linear part 412 on the side opposite to the first connection end part 411 is connected via a first coupling part 414 to the first open end 413.

The first open end 413 is arranged at a position facing the outer edge of the coil antenna 3 via the first linear part 412 in planar view. Therefore, the first open end 413 is configured such that the outer edge of the coil antenna 3 is not directly visible from the first open end 413 due to the first linear part 412 located between the first open end 413 and the outer edge of the coil antenna 3. In this exemplary embodiment, a shortest distance D1 between the first open end part 413 and the first linear part 412 is set greater than a shortest distance D2 between the first linear part 412 and the outer edge of the coil antenna 3.

As further shown, the first coupling part 414 is disposed to extend from the end 412a of the first linear part 412 and turn around 180 degrees to the first open end 413 arranged near the UHF-band RFIC element 6. In this embodiment, the first coupling part 414 has a first open end side portion 414a extending from the first open end 413 in the X direction (including a substantially X direction) so as to have a directionality in a direction intersecting with the X direction.

Moreover, the second dipole element 42 includes a second connection end 421 and a second open end 422.

As shown, the second connection end 421 is a portion connected to a second input/output terminal 6b of the UHF-band RFIC element 6. The second connection end 421 is connected via a second coupling part 423 to the second open end 422.

The second open end 422 is arranged at a position farther from the outer edge of the coil antenna 3 than the shortest distance D2 between the first linear part 412 and the outer edge of the coil antenna 3. Therefore, a shortest distance D3 between the second open end 422 and the outer edge of the coil antenna 3 is set greater than the shortest distance D2 between the first linear part 412 and the outer edge of the coil antenna 3. In this embodiment, the second open end 422 is arranged between the lateral outer edge of the coil antenna 3 and a lateral outer edge of the support base material 2.

The second coupling part 423 is disposed to extend from the second connection end 421 along an upper outer edge and the lateral outer edge of the support base material 2 to the second open end 422. In this embodiment, the second coupling part 423 has a second open end side portion 423a extending from the second open end 422 in a Y direction (including a substantially X direction) so as to have a directionality in a direction intersecting with the Y direction.

Figure 2:
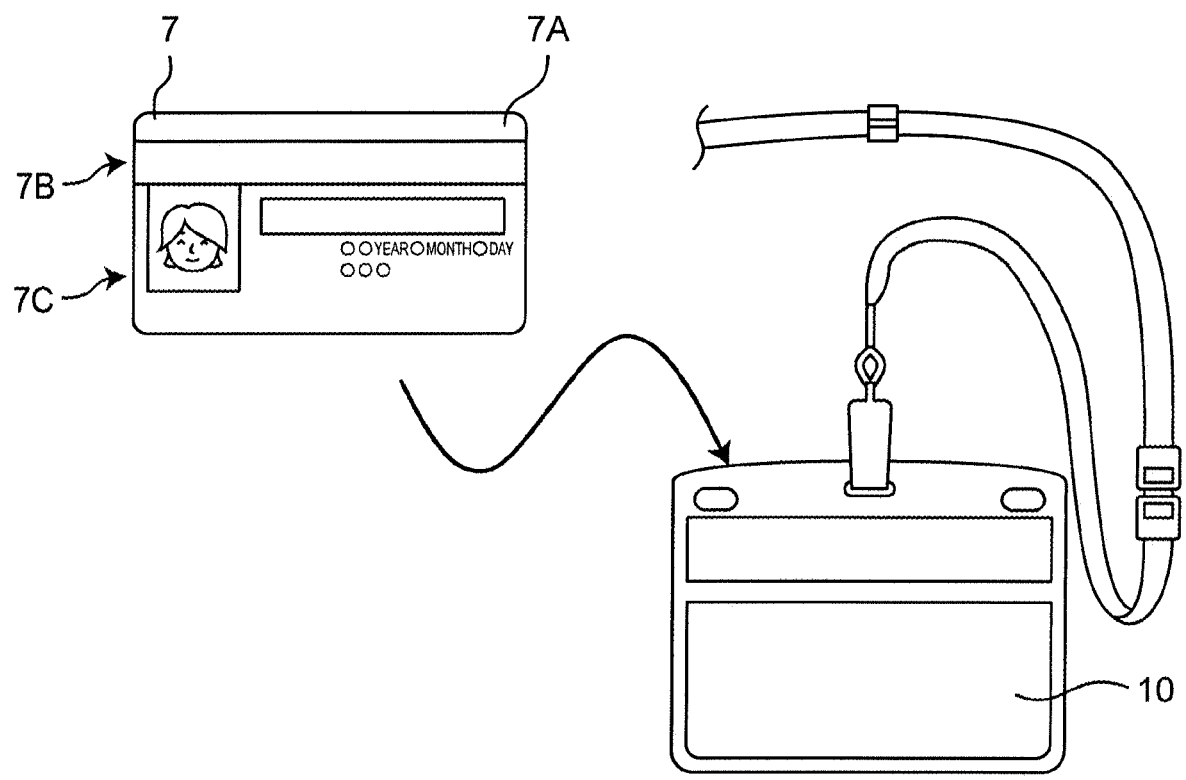
FIG. 2 is an explanatory diagram showing how the IC card of FIG. 1 is stored in a card holder.

FIG. 2 is an explanatory diagram showing how the IC card 1 of FIG. 1 is stored in a card holder 10.

In general, the IC card 1 includes an exterior member 7 on both main surfaces of the support base material 2. The coil antenna 3 and the dipole antenna 4 are covered by the exterior member 7 so as not to be exposed to the outside. The exterior member 7 is made of a resin material such as polyethylene terephthalate or polyimide, for example.

As shown, the exterior member 7 has a display surface 7A on which vertically oriented information is displayed. The vertically oriented information can be information such as characters, numbers, figures (e.g., arrows and marks), and photographs (e.g., portrait photographs).

In this embodiment, the UHF-band RFIC element 6 is arranged at a position corresponding to an upper region of the display surface 7A. Therefore, at least a portion of the dipole antenna 4 connected to the UHF-band RFIC element 6 is also arranged at a position corresponding to an upper region 7B of the display surface 7A. The coil antenna 3 is arranged at a position corresponding to a region 7C lower than the upper region 7B of the display surface 7A.

The IC card 1 is stored in the card holder 10 such that the display surface 7A faces forward with the upper region 7B of the display surface 7A up.

An example of the configuration of the UHF-band RFIC element 6 will be described.

Figure 3:
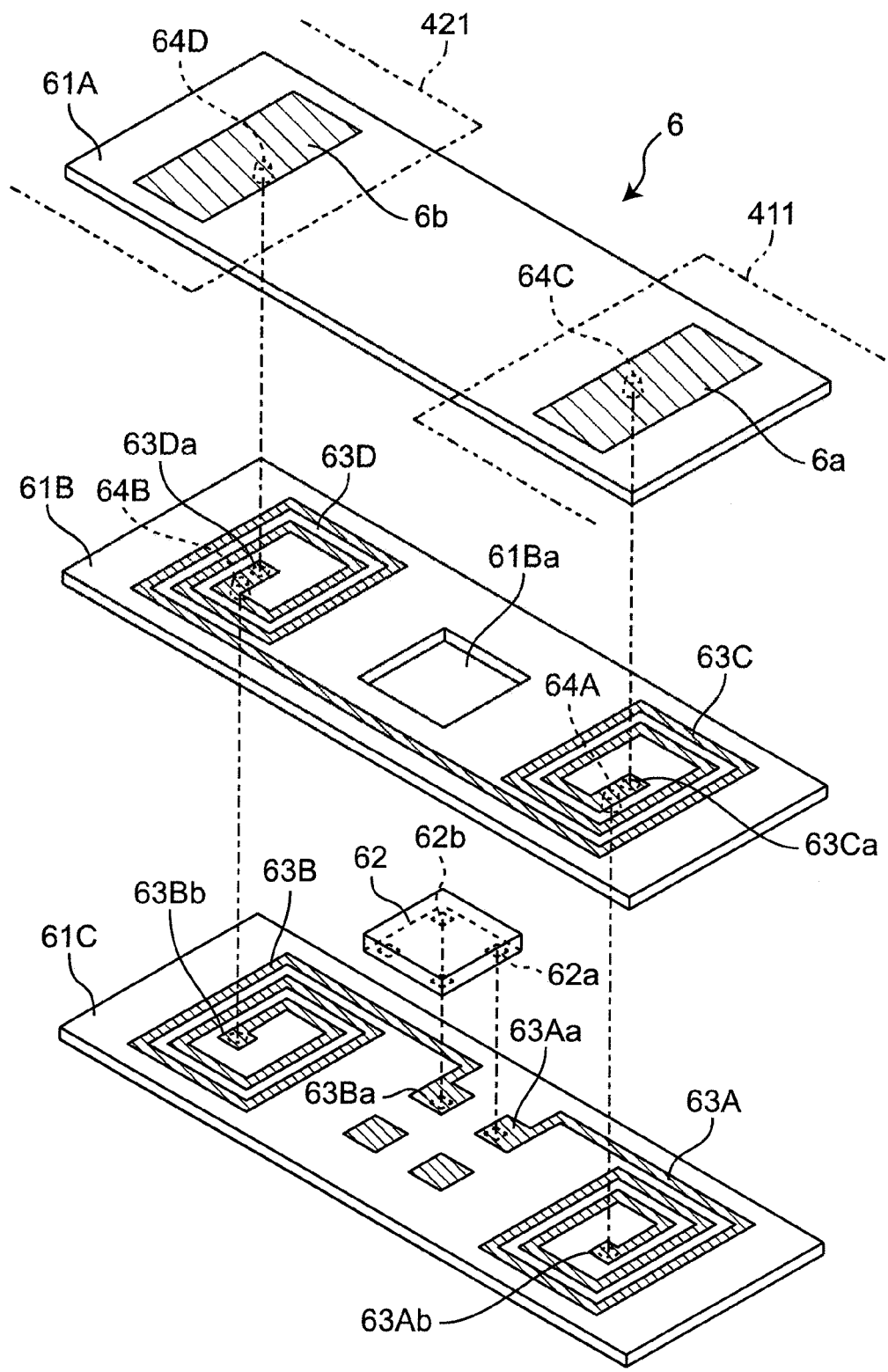
FIG. 3 is an exploded perspective view showing an example of a configuration of a UHF-band RFIC element included in the IC card of FIG. 1.

FIG. 3 is an exploded perspective view showing an example of the configuration of the UHF-band RFIC element 6. FIG. 3 shows a state in which the UHF-band RFIC element 6 shown in FIG. 1 is turned upside down and disassembled.

As shown in FIG. 3, the UHF-band RFIC element 6 comprises a multilayer substrate including three layers. Specifically, the UHF-band RFIC element 6 is formed by laminating flexible insulating sheets 61A, 61B, 61C made of a resin material such as polyimide or liquid crystal polymer. The number of laminated base material layers in the multilayer substrate can appropriately be adjusted depending on a required inductance value etc.

The UHF-band RFIC element 6 has an RFIC chip 62, multiple inductance elements 63A, 63B, 63C, 63D, and the first input/output terminal 6a and the second input/output terminal 6b serving as external connection terminals. In this embodiment, the inductance elements 63A to 63D, the first input/output terminal 6a, and the second input/output terminal 6b are formed on the insulating sheets 61A to 61C and are made of a conductive material such as copper.

Moreover, the RFIC chip 62 is mounted on the insulating sheet 61C in a central part in the longitudinal direction. The RFIC chip 62 has a structure in which various elements are built in a semiconductor substrate made of a semiconductor such as silicon. The RFIC chip 62 includes a first input/output terminal 62a and a second input/output terminal 62b.

The inductance element 63A comprises a conductor pattern disposed in a spiral coil shape on the insulating sheet 61C on one side in the longitudinal direction of the insulating sheet 61C. One end (e.g., an end part on the coil outer side) of the inductance element 63A is provided with a land 63Aa connected to the first input/output terminal 62a of the RFIC chip 62. The other end (e.g., an end part on the coil center side) of the inductance element 63A is provided with a land 63Ab.

The inductance element 63B comprises a conductor pattern disposed in a spiral coil shape on the insulating sheet 61C on the other side in the longitudinal direction of the insulating sheet 61C. One end (e.g., an end part on the coil outer side) of the inductance element 63B is provided with a land 63Ba connected to the second input/output terminal 62b of the RFIC chip 62. The other end (e.g., an end part on the coil center side) of the inductance element 63B is provided with a land 63Bb.

The inductance element 63C comprises a conductor pattern disposed in a spiral coil shape on the insulating sheet 61B on one side in the longitudinal direction the insulating sheet 61B. The inductance element 63C is opposite to the inductance element 63A in a lamination direction. One end (e.g., an end on the coil center side) of the inductance element 63C is provided with a land 63Ca. The land 63Ca is connected to the lands 63Ab of the inductance element 63A on the insulating sheet 61C via an interlayer connection conductor 64A such as a through-hole conductor penetrating the insulating sheet 61B.

The inductance element 63D comprises a conductor pattern disposed in a spiral coil shape on the insulating sheet 61B on the other side in the longitudinal direction of the insulating sheet 61B. The inductance element 63D is opposite to the inductance element 63B in the lamination direction. One end (e.g., an end part on the coil center side) of the inductance element 63D is provided with a land 63Da. The land 63Da is connected to the land 63Bb of the inductance element 63B on the insulating sheet 61C via an interlayer connection conductor 64B such as a through-hole conductor penetrating the insulating sheet 61B.

The inductance elements 63C, 63D on the insulating sheet 61B are integrated as one conductor pattern. Specifically, the respective other ends (e.g., ends on the coil outer side) are connected to each other. The insulating sheet 61B is provided with a through-hole 61Ba in which the RFIC chip 62 mounted on the insulating sheet 61C is received.

The first input/output terminal 6a and the second input/output terminal 6b are made up of conductor patterns disposed on the insulating sheet 61A according to the exemplary embodiment. Moreover, the first input/output terminal 6a and the second input/output terminal 6b are opposite in the longitudinal direction of the insulating sheet 61A.

As further shown, the first input/output terminal 6a is connected to the land 63Ca of the inductance element 63C on the insulating sheet 61B via an interlayer connection conductor 64C such as a through-hole conductor penetrating the insulating sheet 61A. The first input/output terminal 6a is connected to the first connection end part 411 of the first dipole element 41 shown in FIG. 1.

Similarly, the second input/output terminal 6b is connected to the land 63Da of the inductance element 63D on the insulating sheet 61B via an interlayer connection conductor 64D such as a through-hole conductor penetrating the insulating sheet 61A. The second input/output terminal 6b is connected to the second connection end part 421 of the second dipole element 42 shown in FIG. 1.

The RFIC chip 62 is disposed between the inductance elements 63A, 63B and between the inductance elements 63C, 63D. Since the RFIC chip 62 is configured to function as a shield, magnetic-field coupling and capacitive coupling are suppressed between the inductance elements 63A, 63B having the spiral coil shape disposed on the insulating sheet 61C. Similarly, magnetic-field coupling and capacitive coupling are suppressed between the inductance elements 63C, 63D having the spiral coil shape disposed on the insulating sheet 61B. As a result, a passband of communication signals is prevented from narrowing.

An equivalent circuit of the UHF-band RFIC element 6 will be described.

Figure 4:
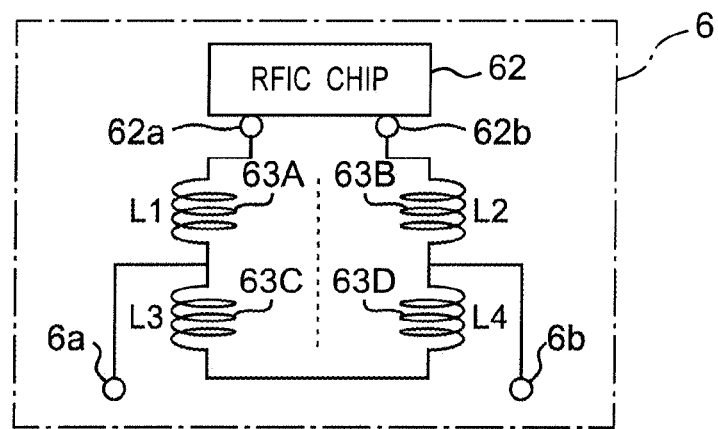
FIG. 4 is an equivalent circuit diagram of the UHF-band RFIC element of FIG. 3.

FIG. 4 is an equivalent circuit diagram of the UHF-band RFIC element 6. For purposes of this disclosure, in FIG. 4, an inductor L1 corresponds to the inductance element 63A; an inductor L2 corresponds to the inductance element 63B; an inductor L3 corresponds to the inductance element 63C; and an inductor L4 corresponds to the inductance element 63D. Impedance matching by a feeder circuit made up of the inductance elements 63A to 63D and the interlayer connection conductors 64A to 64D has characteristics defined by values of the inductors L1 to L4.

One end of the inductor L1 is connected to the first input/output terminal 62a of the RFIC chip 62. One end of the inductor L2 is connected to the second input/output terminal 62b of the RFIC chip 62. The other end of the inductor L1 is connected to one end of the inductor L3. The other end of the inductor L2 is connected to one end of the inductor L4. The other end of the inductor L3 is connected to the other end of the inductor L4. The first input/output terminal 6a is connected to a connection point between the inductors L1, L3 and, similarly, the second input/output terminal 6b is connected to a connection point between the inductors L2, L4.

As can be seen from the equivalent circuit shown in FIG. 4, the inductance elements 63A, 63B, 63C, 63D wound to form magnetic fields in phase and are connected in series to each other.

Moreover, as can be seen from the configuration of the UHF-band RFIC element 6 shown in FIG. 3, the inductance elements 63A, 63C have substantially the same loop shape and the same first winding axis. Similarly, the inductance elements 63B, 63D have substantially the same loop shape and the same second winding axis. The first winding axis and the second winding axis are arranged at positions where the RFIC chip 62 is interposed therebetween. Therefore, the inductance elements 63A, 63C are magnetically and capacitively coupled. Similarly, the inductance elements 63B, 63D are magnetically and capacitively coupled.

According to the IC card 1 of this exemplary embodiment, the first open end 413 is arranged at a position facing the outer edge of the coil antenna 3 via the first linear part 412 in planar view. According to this configuration, interference with the first dipole element 41 by the coil antenna 3 can be suppressed. Therefore, the first dipole element 41 can entirely be arranged closer to the outer edge of the coil antenna 3. The element length of the first dipole element 41 can be ensured, and frequency adjustment can be facilitated.

According to the IC card 1 of this embodiment, the second open end 422 of the second dipole element 42 is arranged at a position farther from the outer edge of the coil antenna 3 than the shortest distance D2 between the first linear part 412 and the outer edge of the coil antenna 3. According to this configuration, interference with the second dipole element 42 by the coil antenna 3 can also be suppressed. As a result, a deterioration in the communication performance of the dipole antenna 4 can be suppressed while a larger size of the coil antenna 3 is ensured in a limited card size.

According to the IC card 1 of this embodiment, the shortest distance D1 between the first open end 413 and the first linear part 412 is set greater than the shortest distance D2 between the first linear part 412 and the outer edge of the coil antenna 3. According to this configuration, the first open end 413 is farther from the outer edge of the coil antenna 3, so that the interference with the first dipole element 41 by the coil antenna 3 can further be suppressed.

According to the IC card 1 of this embodiment, the first dipole element 41 has the first open end side portion 414*a* extending from the first open end 413 in the X direction, and the second dipole element 42 has the second open end side portion 423*a* extending from the second open end 422 in the Y direction. According to this configuration, a range of signal transmission/reception by the dipole antenna 4 can be expanded.

Moreover, according to the IC card 1 of this exemplary embodiment, the exterior member 7 is included to cover and prevent the coil antenna 3 and the dipole antenna 4 from being exposed to the outside and has the display surface 7A on which vertically oriented information is displayed. The UHF-band RFIC element 6 is arranged at a position corresponding to the upper region 7B of the display surface 7A, and the coil antenna 3 is arranged at a position corresponding to the region 7C lower than the upper region 7B of the display surface 7A. According to this configuration, signals in the UHF band can more reliably be transmitted/received between a UHF-band reader device usually arranged above a user such as on a ceiling and the dipole antenna 4, while the interference by the coil antenna 3 is suppressed.

In the first dipole element 41, preferably, a portion forming ¹⁄₁₀ or more of the entire length of the first dipole element 41 from the first open end 413 is arranged at a position facing the outer edge of the coil antenna 3 via the first linear part 412 in planar view. In other words, the length of the first open end side portion 414*a* is preferably ¹⁄₁₀ or more of the entire length of the first dipole element 41. According to this configuration, the first open end side portion 414*a* mainly contributing to signal transmission/reception is arranged at a position facing the outer edge of the coil antenna 3 via the first linear part 412, so that the interference by the coil antenna 3 can further be suppressed.

In the first dipole element 41, more preferably, a portion forming ¼ or more of the entire length of the first dipole element 41 from the first open end 413 is arranged at a position facing the outer edge of the coil antenna 3 via the first linear part 412 in planar view. In other words, the length of the first open end side portion 414*a* is preferably ¼ or more of the entire length of the first dipole element 41. According to this configuration, the first open end side portion 414*a* mainly contributing to signal transmission/reception is arranged at a position facing the outer edge of the coil antenna 3 via the first linear part 412, so that the interference by the coil antenna 3 can further be suppressed.

It is noted that the present invention is not limited to the exemplary embodiment described above and can be implemented in other various forms. For example, in the above description, the interference with the second dipole element 42 by the coil antenna 3 is suppressed simply by increasing the shortest distance D3 between the second open end 422 and the outer edge of the coil antenna 3. However, it should be appreciated that the present invention is not limited to this configuration.

Figure 5:
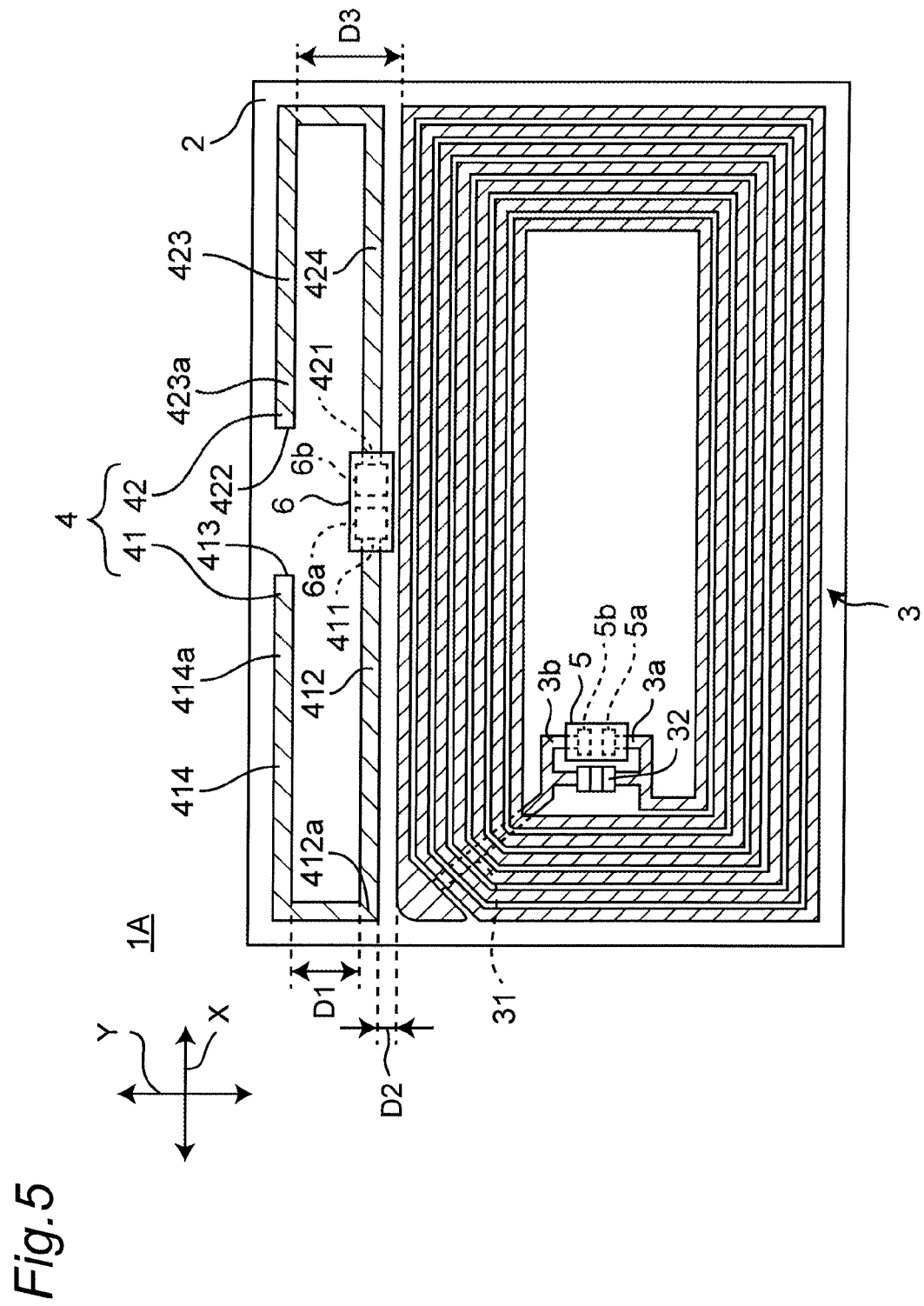
FIG. 5 is a plan view showing a first modification of the IC card of FIG. 1.

For example, as in an IC card 1A according to a first modification shown in FIG. 5, the second dipole element 42 may have a second linear part 424 arranged to extend from the second connection end 421 along the outer edge of the coil antenna 3. The second open end 422 may be arranged at a position facing the outer edge of the coil antenna 3 via the second linear part 424 in planar view, and the second open end side portion 423*a* may be arranged to extend in the X direction. Therefore, the first dipole element 41 and the second dipole element 42 may have the same (i.e., left-right symmetric) configuration in the X direction. According to this configuration, the interference with the second dipole element 42 by the coil antenna 3 can further be suppressed, and the second dipole element 42 can entirely be arranged closer to the outer edge of the coil antenna 3. As a result, a deterioration in the communication performance of the dipole antenna 4 can be suppressed while a larger size of the coil antenna 3 is ensured in a limited card size.

Figure 6:
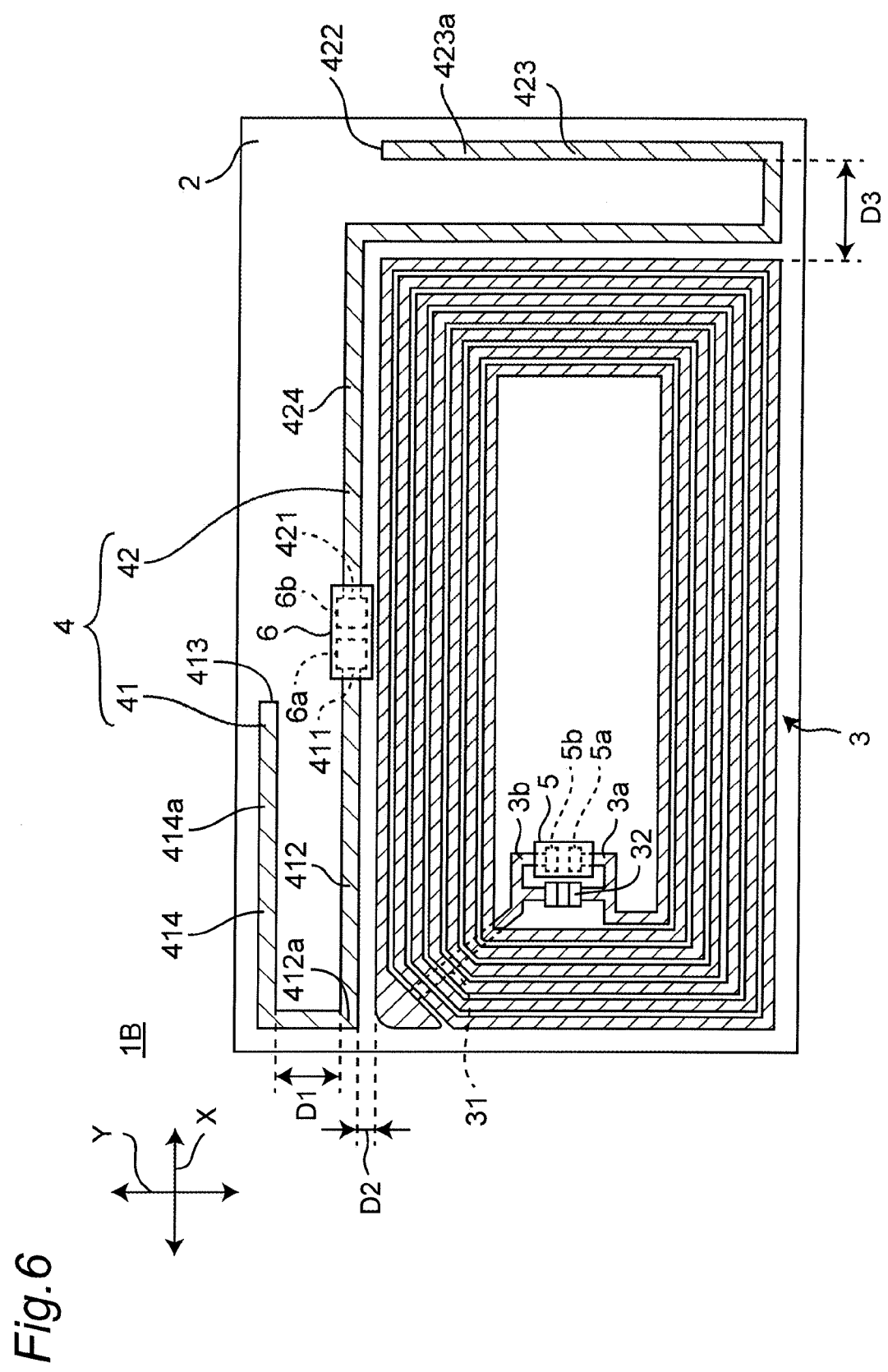
FIG. 6 is a plan view showing a second modification of the IC card of FIG. 1.

In another example, an IC card 1B according to a second modification is shown in FIG. 6. As shown, the second linear part 424 may be formed into an L shape so as to extend from the second connection end 421 in the X direction and the Y direction along the outer edge of the coil antenna 3. The second open end side portion 423*a* may be arranged to extend in the Y direction. According to this configuration, the range of signal transmission/reception by the dipole antenna 4 can be expanded as compared to the configuration of the IC card 1A shown in FIG. 5.

Figure 7:
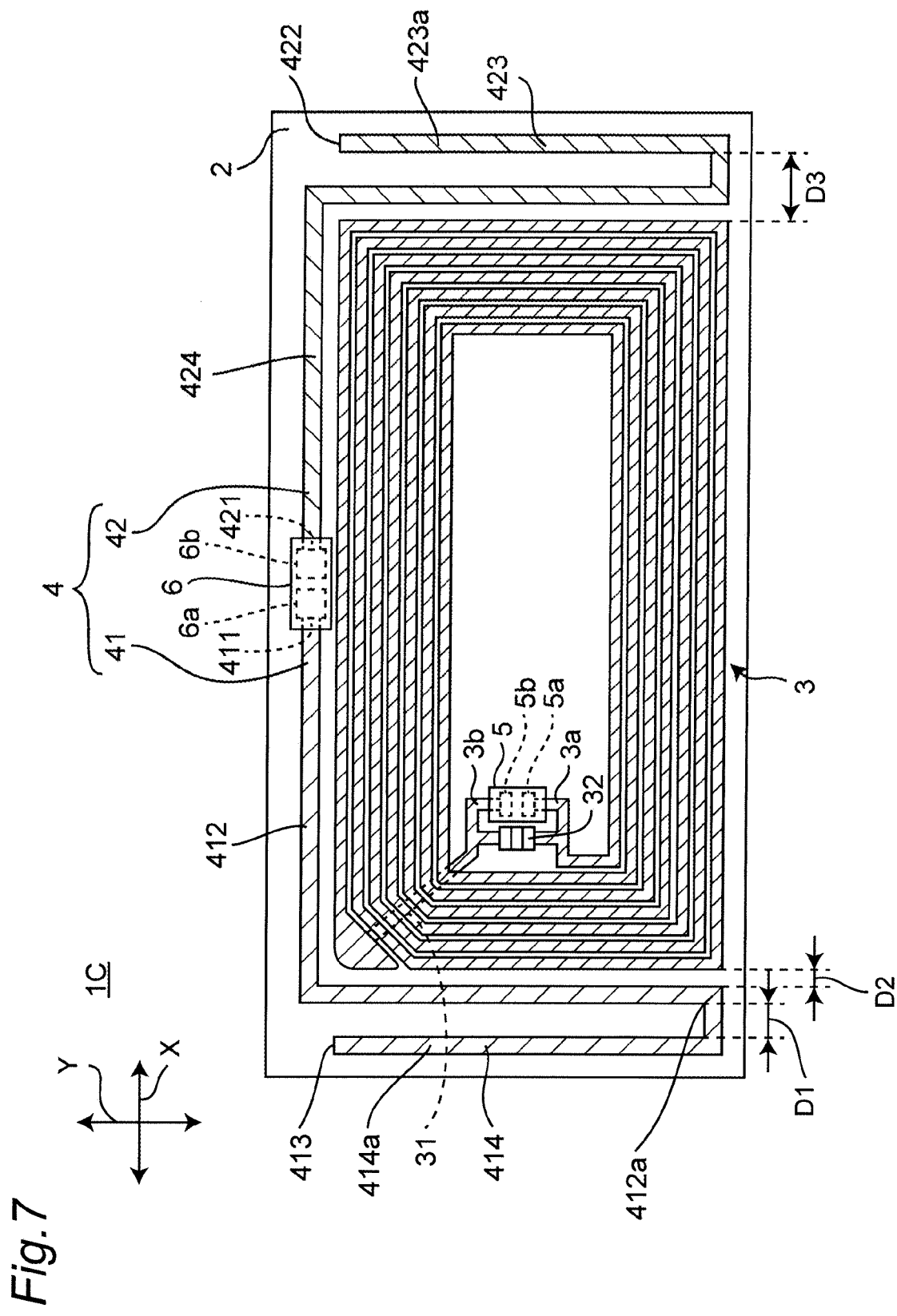
FIG. 7 is a plan view showing a third modification of the IC card of FIG. 1.

In another example, an IC card 1C according to a third modification is shown in FIG. 7. As shown, the first linear part 412 may be formed into an L shape so as to extend from the first connection end 411 in the X direction and the Y direction along the outer edge of the coil antenna 3. The first open end side portion 414*a* may be arranged to extend in the Y direction. This configuration also can expand the range of signal transmission/reception by the dipole antenna 4 as compared to the configuration of the IC card 1A shown in FIG. 5.

Figure 8:
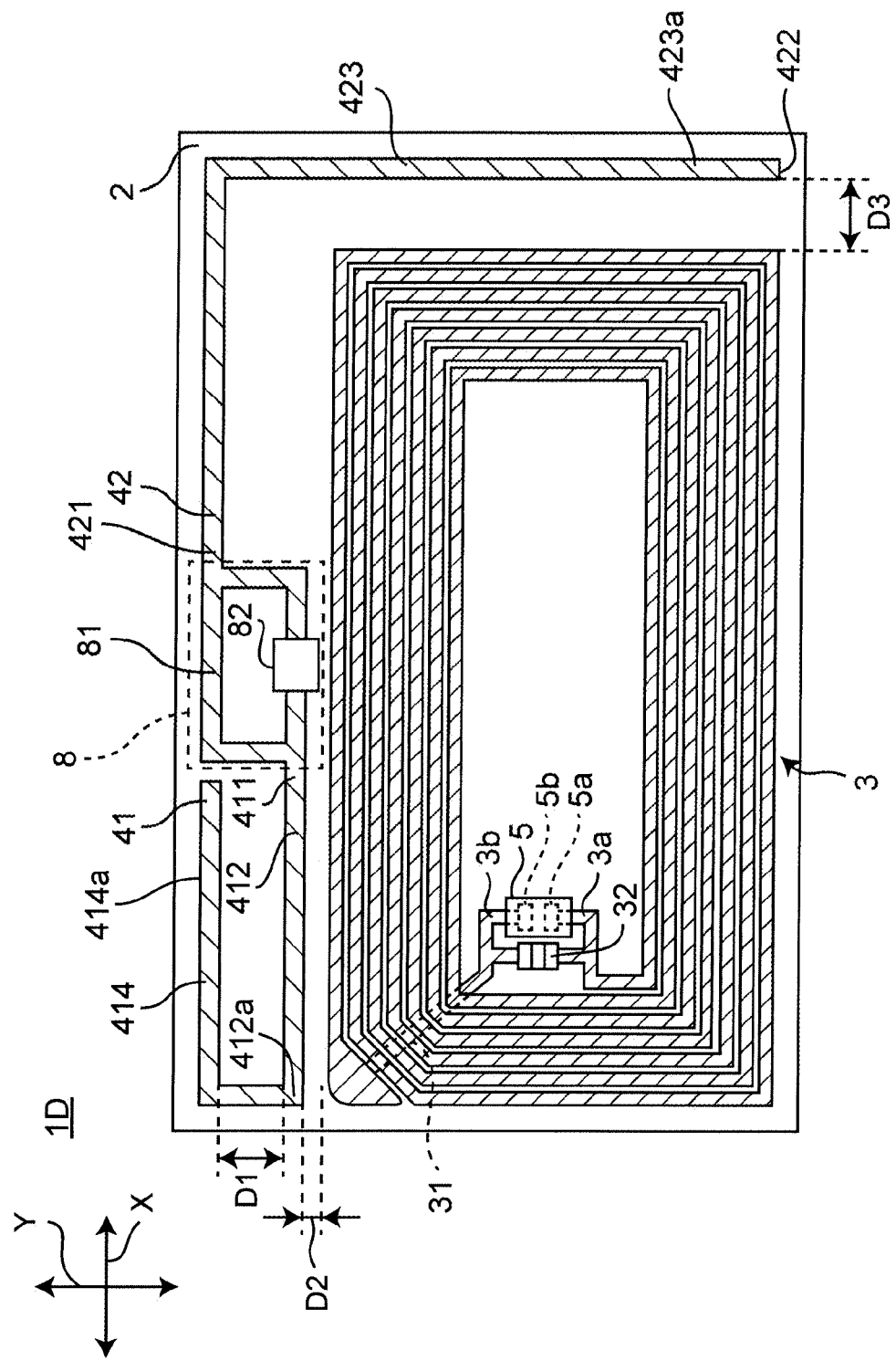
FIG. 8 is a plan view showing a fourth modification of the IC card of FIG. 1.

In the above description, the UHF-band RFIC element 6 having the configuration shown in FIG. 3 is used as the second-frequency-band RFIC element. However, it is noted that the present invention is not limited thereto. For example, as in an IC card 1D according to a fourth modification shown in FIG. 8, a UHF-band RFIC element 8 may be used instead of the UHF-band RFIC element 6. In the IC card 1D, the UHF-band RFIC element 8 includes a loop electrode 81 as an impedance adjustment part, and an RFIC chip 82 connected to the loop electrode 81. The first connection end 411 of the first dipole element 41 and the second connection end 421 of the second dipole element 42 are connected to the loop electrode 81. This IC card 1D can also provide the same effects as the IC card 1 shown in FIG. 1.

In the above description, the first coupling part 414 of the first dipole element 41 is formed into an L shape. However, the exemplary embodiment of the present invention is not limited to this configuration. For example, as in an IC card 1E according to a fifth modification shown in FIG. 9, the first coupling part 414 may be formed in a linear shape extending in the Y direction. Even in this configuration, the first open end 413 is arranged at a position facing the outer edge of the coil antenna 3 via the first linear part 412 in planar view, so that the interference with the first dipole element 41 by the coil antenna 3 can be suppressed. As described above with reference to FIG. 5, the second dipole element 42 may have the same (i.e., left-right symmetric) configuration as the first dipole element 41 in the X direction.

Figure 9:
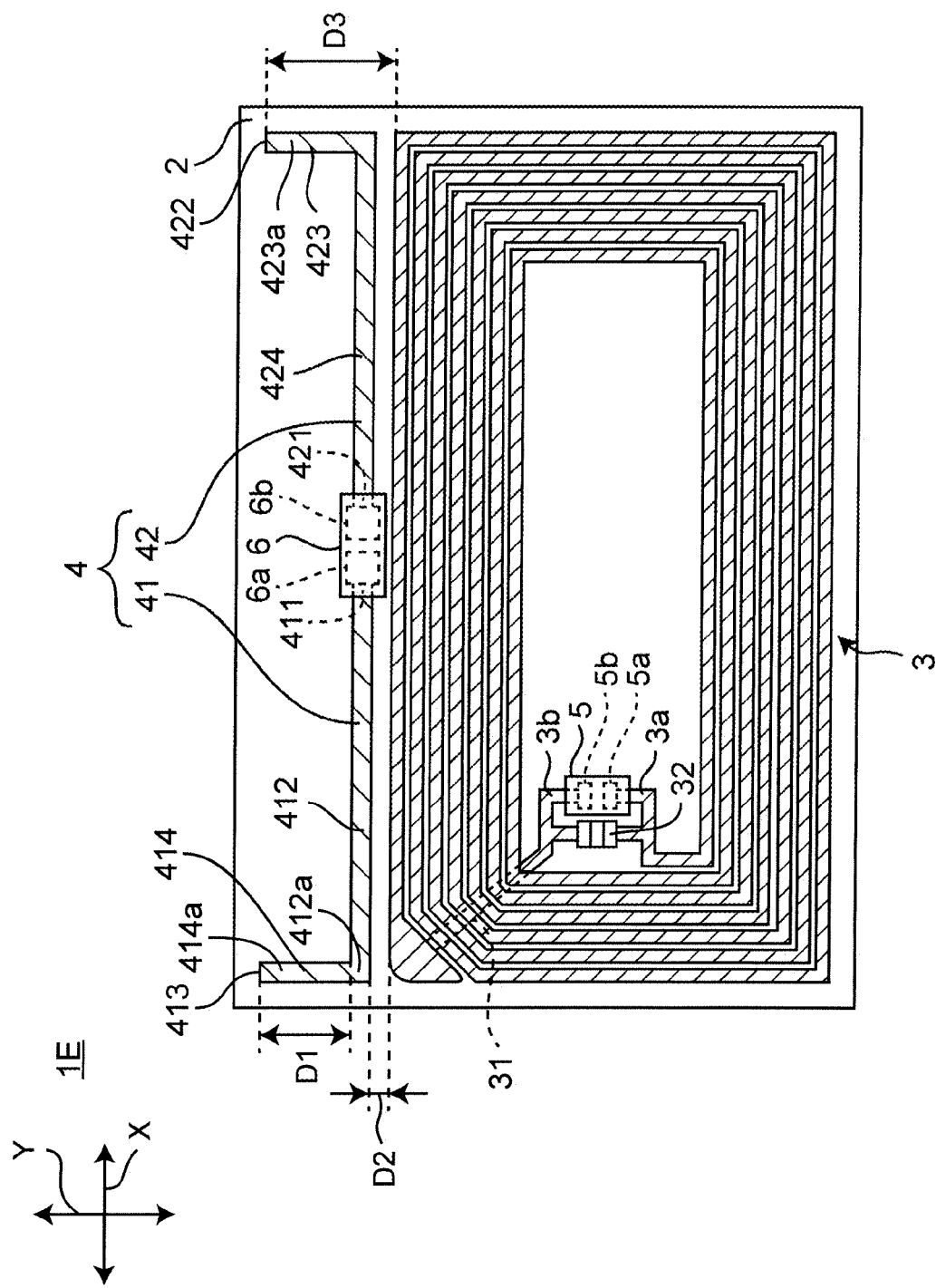
FIG. 9 is a plan view showing a fifth modification of the IC card of FIG. 1.
Figure 10:
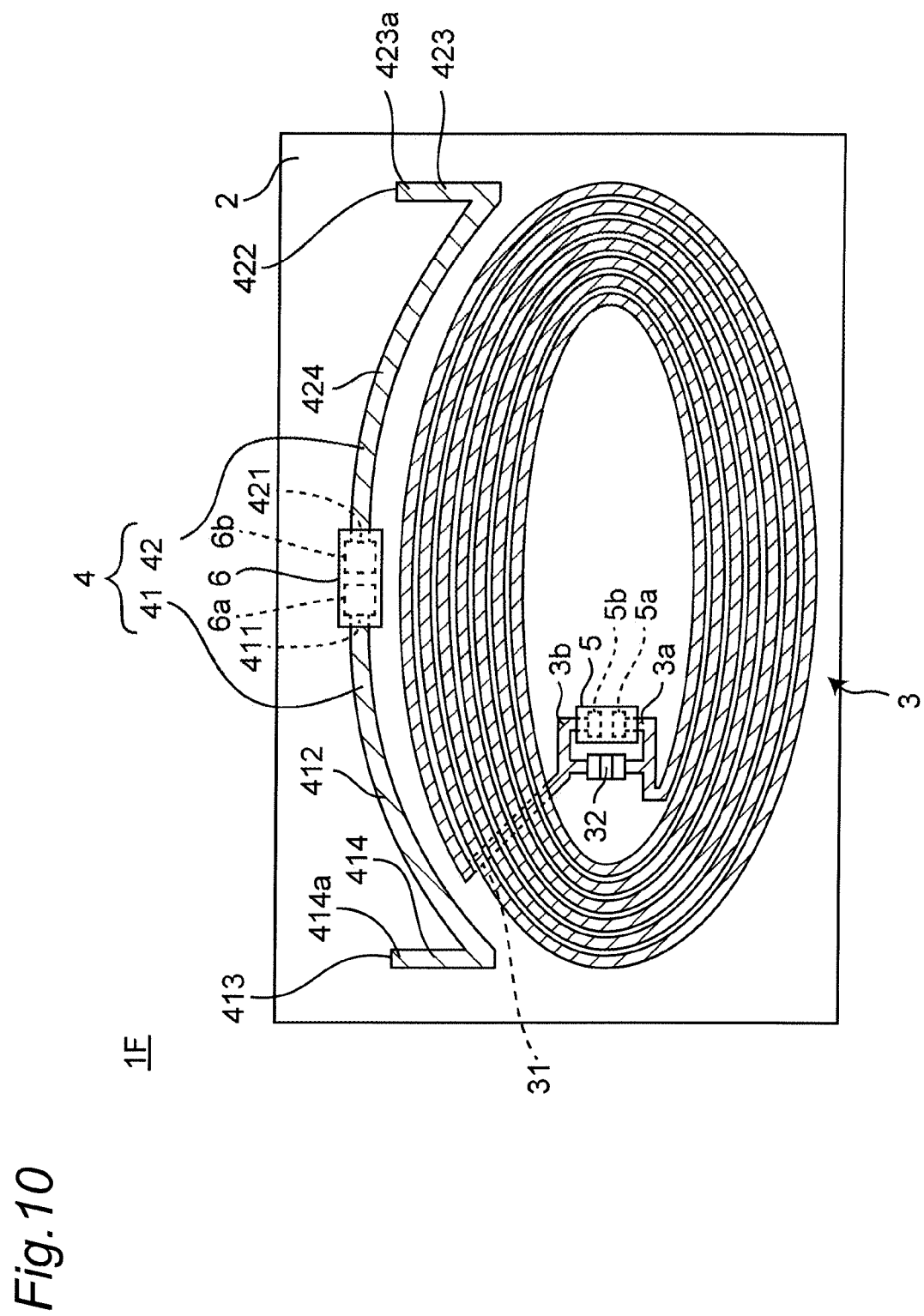
FIG. 10 is a plan view showing a sixth modification of the IC card of FIG. 1.

In FIG. 9, the outer edge of the coil antenna 3 is rectangular, and the first linear part 412 and the second linear part 424 are formed into a linear shape extending in the X direction. However, the exemplary embodiment of the present invention is not limited to this configuration. For example, as in an IC card 1F according to a sixth modification shown in FIG. 10, the outer edge of the coil antenna 3 may be circular or elliptical, and the first linear part 412 and the second linear part 424 may be formed into an arc shape or a curved shape. According to this configuration, the space for arranging the dipole antenna 4 can be made smaller.

The shapes of the first coupling part 414 and the second coupling part 423 are not particularly limited and may be formed into a meander shape, for example.

In the above description, the first frequency band is the HF band and the second frequency band is the UHF band. However, it should be appreciated that the second frequency band may be higher than the first frequency band.

In the above description, the UHF-band RFIC element 6 is arranged adjacently in the vicinity of the center of the long side of the rectangular outer edge of the coil antenna 3. However, in an alternative aspect, the UHF-band RFIC element 6 may be arranged adjacently in any portion of the outer edge of the coil antenna 3.

Figure 11:
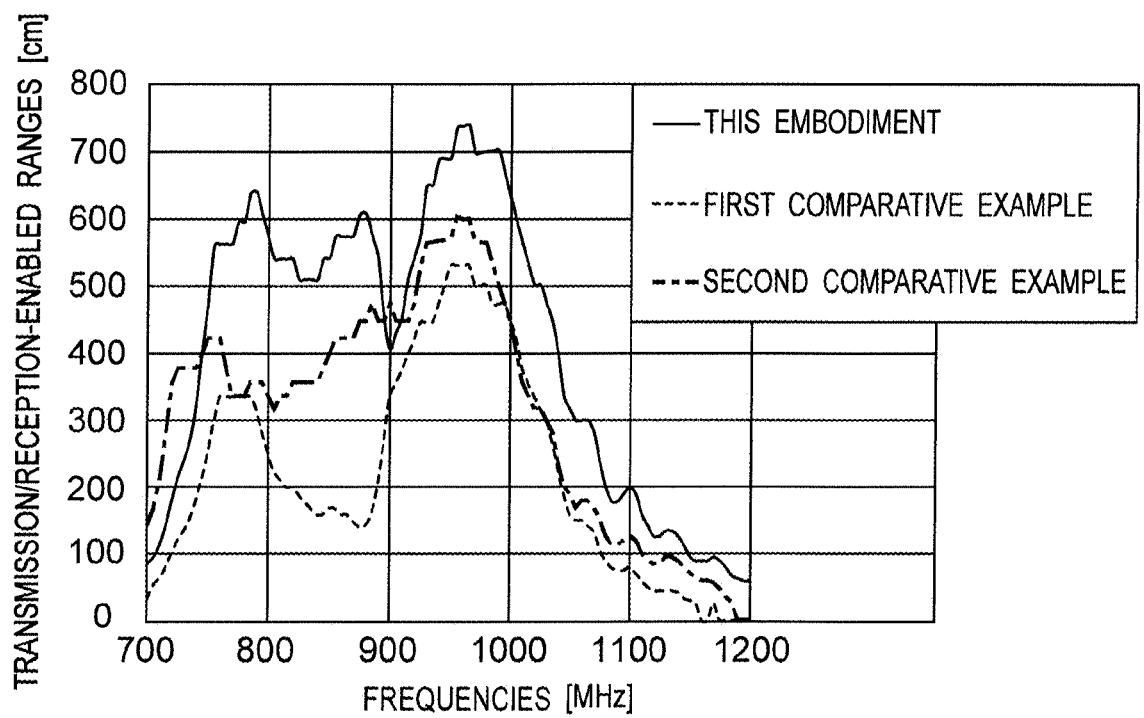
FIG. 11 is a graph showing a relationship between frequencies of UHF-band signals and transmission/reception-enabled ranges of the signals in the IC card shown in FIG. 1, an IC card according to a first comparative example, and an IC card according to a second comparative example.

Description will be made of results of performance evaluation tests performed on the IC card 1 according to this embodiment, an IC card 101 according to a first comparative example, and an IC card 102 according to a second comparative example. FIG. 11 is a graph showing a relationship between frequencies of UHF-band signals and transmission/reception-enabled ranges of the signals in the IC card 1 shown in FIG. 1, the IC card 101 according to the first comparative example, and the IC card 102 according to the second comparative example.

Figure 12:
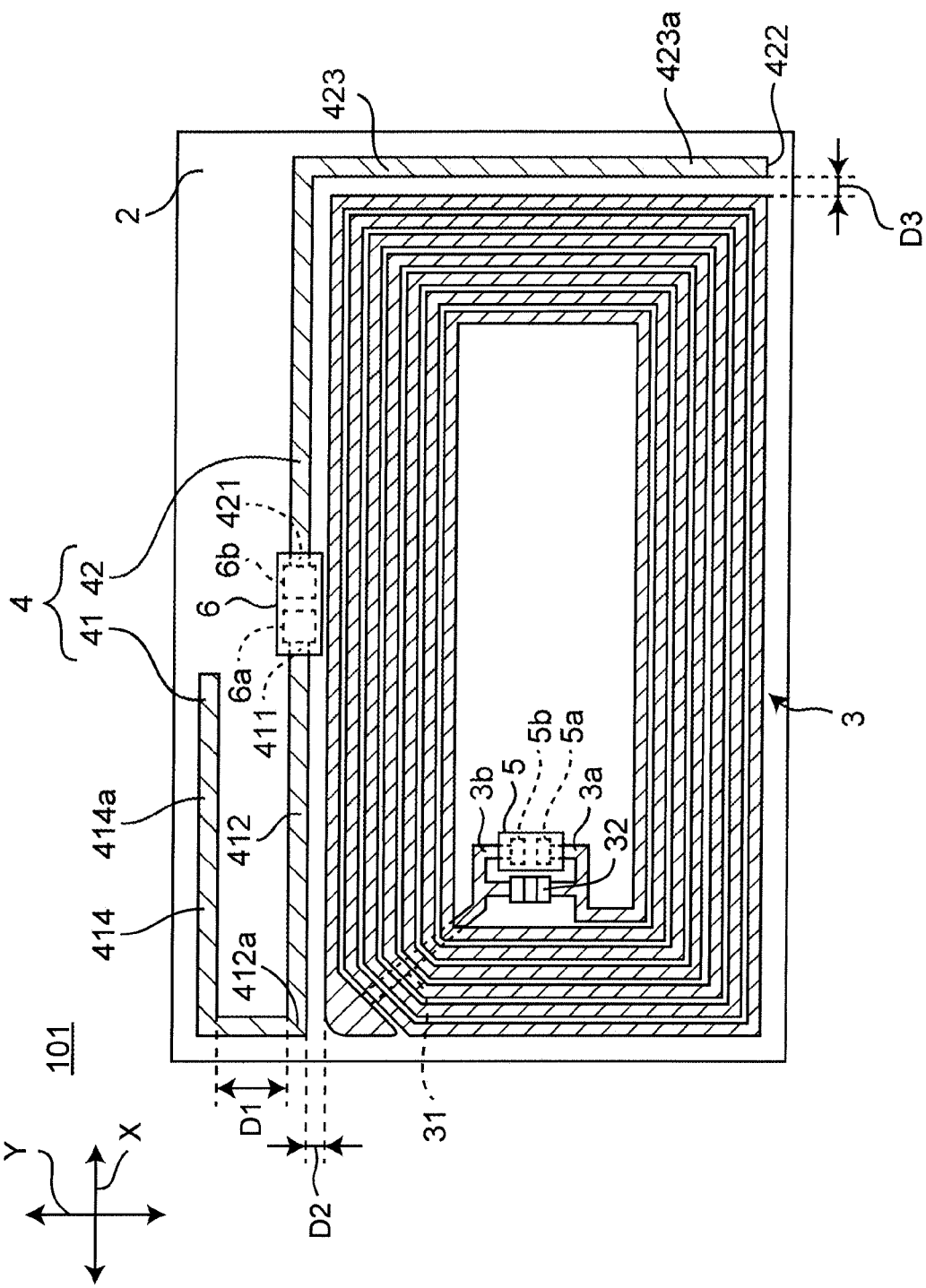
FIG. 12 is a plan view showing a configuration of the IC card according to the first comparative example.

An IC card having a structure shown in FIG. 12 was manufactured as the IC card 101 according to the first comparative example. The IC card 101 according to the first comparative example is different from the IC card 1 shown in FIG. 1 in that the shortest distance D3 between the second open end 422 and the outer edge of the coil antenna 3 is set equal to or less than the shortest distance D2 between the first linear part 412 and the outer edge of the coil antenna 3. Since the other configurations are the same, the same members are denoted by the same reference numerals.

Figure 13:
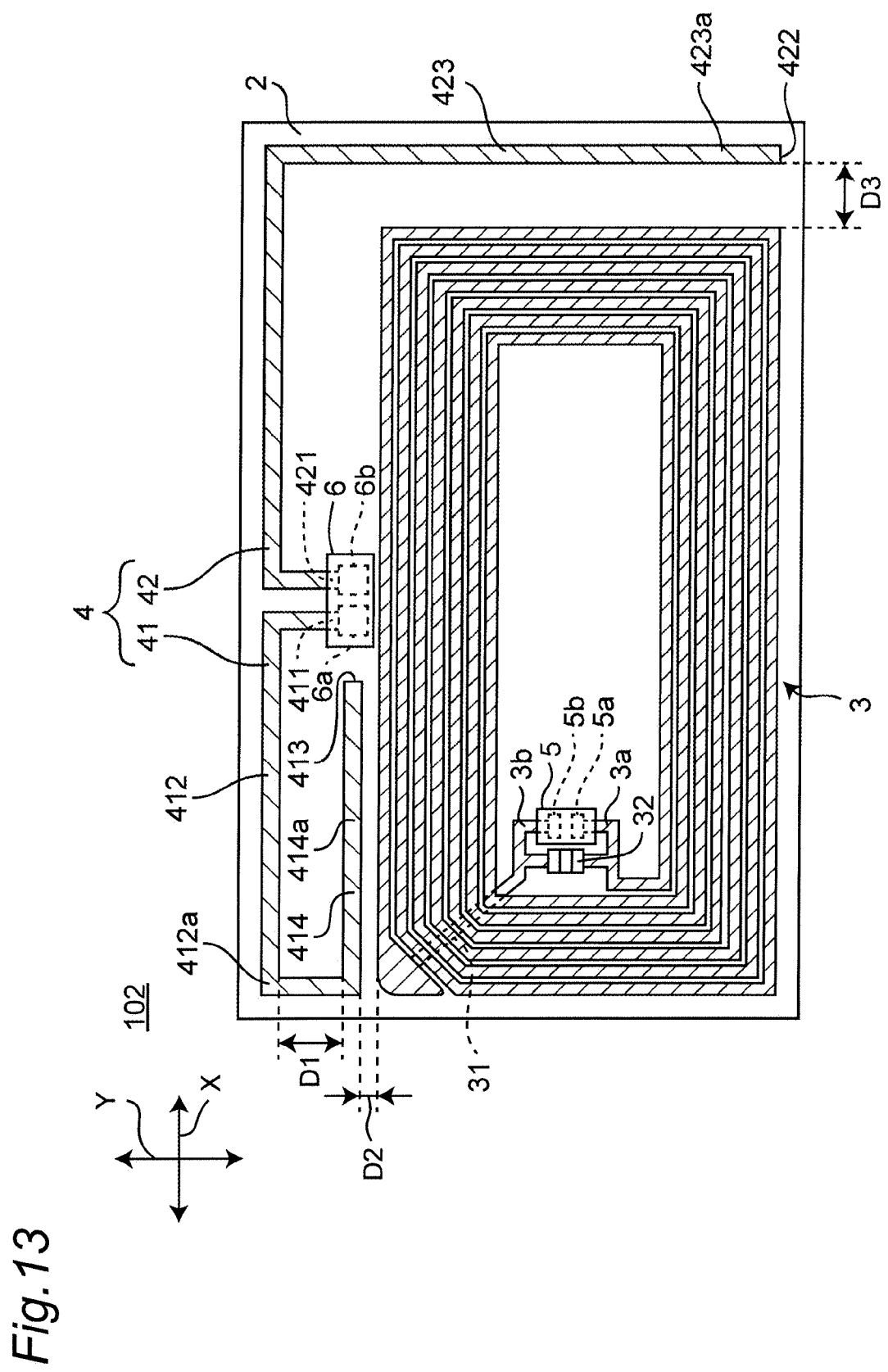
FIG. 13 is a plan view showing a configuration of the IC card according to the second comparative example.

An IC card having a structure shown in FIG. 13 was manufactured as the IC card 102 according to the second comparative example. The IC card 102 according to the second comparative example is different from the IC card 1 shown in FIG. 1 in that the first open end 413 is arranged closer to the outer edge of the coil antenna 3 than the first linear part 412. Since the other configurations are the same, the same members are denoted by the same reference numerals.

It can be seen from FIG. 11 that the IC card 1 expands the transmission/reception-enabled ranges of the signals with respect to a reader device basically in any frequency and suppressed a deterioration in communication performance as compared to the IC card 101 according to the first comparative example and the IC card 102 according to the second comparative example.

In general, it is noted that although the present invention has been sufficiently described in terms of the exemplary embodiments with reference to the accompanying drawings, various modifications and corrections are apparent to those skilled in the art. It should be understood that such modifications and corrections are included in the present invention without departing from the scope of the present invention according to the accompanying claims.

The exemplary embodiments of present invention enable the suppression of a deterioration in communication performance of a dipole antenna while ensuring a larger coil antenna size in a limited card size and is therefore useful for an IC card compatible with both an HF-band RFID system and a UHF-band RFID system, for example.

EXPLANATIONS OF LETTERS OR NUMERALS

1, 1A, 1B, 1C, 1D, 1E, 1F IC card
2 support base material
3 coil antenna
3a one end part
3b other end part
4 dipole antenna
5 HF-band RFIC element
5a first input/output terminal
5b second input/output terminal
6 UHF-band RFIC element
6a first input/output terminal
6b second input/output terminal
7 exterior member
7A display surface
7B upper region
7C lower region
8 UHF-band RFIC element
10 card holder
31 bridge conductor
32 capacitor element
41 first dipole element
42 second dipole element
61A, 61B, 61C, 61D insulating sheet
61Ba through-hole
62 RFIC chip
62a first input/output terminal
62b second input/output terminal
63A, 63B, 63C, 63D inductance element
63Aa, 63Ab, 63Ba, 63Bb, 63Ca, 63Da land
64A, 64B, 64C, 64D interlayer connection conductor
81 loop electrode
82 RFIC chip
411 first connection end part
412 first linear part
412a end part
413 first open end part
414 first coupling part
414a first open end side portion
421 second connection end part
422 second open end part 423 second coupling part
423a second open end side portion
424 second linear part

The invention claimed is:

1. A card-type wireless communication device comprising:
   a support base;
   a coil antenna disposed on the support base and configured to transmit and receive data signals in a first frequency band;
   a first-frequency-band radio-frequency integrated circuit ("RFIC") element coupled to the coil antenna;
   a dipole antenna disposed on the support base outside the coil antenna and configured to transmit and receive data signals in a second frequency band higher than the first frequency band; and
   a second-frequency-band RFIC element coupled to the dipole antenna,
   wherein the dipole antenna includes:
      a first dipole element having a first connection end coupled to the second-frequency-band RFIC element, a first linear part extending from the first connection end along an outer edge of the coil antenna, and a first open end disposed at a position facing the outer edge of the coil antenna via the first linear part in a planar view of the support base, and
      a second dipole element having a second connection end coupled to the second-frequency-band RFIC element, and a second open end disposed at a position farther from the outer edge of the coil antenna than a shortest distance between the first linear part and the outer edge of the coil antenna.

2. The card-type wireless communication device according to claim 1, wherein a shortest distance between the first open end and the first linear part is larger than the shortest distance between the first linear part and the outer edge of the coil antenna.

3. The card-type wireless communication device according to claim 1, wherein the first dipole element has a first open end side that extends from the first open end in an X direction, and the second dipole element has a second open end side that extends from the second open end in a Y direction that is perpendicular to the X direction in the planar view of the support base.

4. The card-type wireless communication device according to claim 1, further comprising an exterior member configured to cover and prevent the coil antenna and the dipole antenna from being exposed outside the card-type wireless communication device, with the exterior member having a display surface on which vertically oriented information is displayed.

5. The card-type wireless communication device according to claim 4, wherein the second-frequency-band RFIC element is disposed at a position corresponding to an upper region of the display surface, and the coil antenna is disposed at a position corresponding to a lower region that is lower than the upper region of the display surface, with the upper and lower regions being disposed relative to the vertically oriented information.

6. The card-type wireless communication device according to claim 1, wherein a portion of the first dipole element that forms 1/10 or more of an entire length of the first dipole element from the first open end is disposed at a position facing the outer edge of the coil antenna via the first linear part in the planar view of the support base.

7. The card-type wireless communication device according to claim 1, wherein a portion of the first dipole element forming 1/4 or more of an entire length of the first dipole element from the first open end is disposed at a position facing the outer edge of the coil antenna via the first linear part in the planar view of the support base.

8. The card-type wireless communication device according to claim 1, wherein the second dipole element has a second linear part extending from the second connection end along the outer edge of the coil antenna.

9. The card-type wireless communication device according to claim 8, wherein the second open end is disposed at a position facing the outer edge of the coil antenna via the second linear part in the planar view of the support base.

10. The card-type wireless communication device according to claim 8, wherein the first and second linear parts extend in a direction parallel to the outer edge of the coil antenna in the planar view of the support base.

11. The card-type wireless communication device according to claim 10, wherein the first dipole element and the second dipole element are disposed on the support base to have a symmetrical configuration with respect to each other, with the first open end extending in a direction towards the second open end.

12. The card-type wireless communication device according to claim 1, wherein the first frequency band is an HF band, and the second frequency band is a UHF band.

13. The card-type wireless communication device according to claim 1, wherein the second-frequency-band RFIC element comprises a loop electrode configured to adjust an impedance thereof, and an RFIC coupled to the loop electrode.

14. The card-type wireless communication device according to claim 1, wherein the coil antenna comprises a conductor wire having a plurality of turns forming a rectangular spiral shape, and the first linear part of the first dipole element extends parallel to the outer edge of the coil antenna that forms an outer circumference of the rectangular spiral shape.

15. A card-type wireless communication device comprising:
   a base;
   a coil antenna disposed on the base and having a rectangular spiral shape having a plurality of outer side edges;
   a first-frequency-band radio-frequency integrated circuit ("RFIC") element disposed within the rectangular spiral shape and coupled to the coil antenna;
   a second-frequency-band RFIC element; and
   a dipole antenna disposed on the base a coupled to the second-frequency-band RFIC element, the dipole antenna including:
      a first dipole element having a first connection end coupled to the second-frequency-band RFIC element, a first linear part extending from the first connection end and parallel to a first outer side edge of the plurality of outer side edges of the coil antenna, and a first open end extending from the first linear part and facing the first outer side edge of the coil antenna in a planar view of the base, and
      a second dipole element having a second connection end coupled to the second-frequency-band RFIC element, and a second open end disposed at a position farther from any of the plurality of outer side edges of the coil antenna than a distance between the first linear part and the first outer side edge of the coil antenna.

16. The card-type wireless communication device according to claim 15, wherein the coil antenna is configured to transmit and receive data signals in a first frequency band, and the dipole antenna is configured to transmit and receive data signals in a second frequency band higher than the first frequency band.

17. The card-type wireless communication device according to claim 15, wherein the first dipole element comprises a first connecting part that connects the first open end to the first linear part, with the first connecting part including at least a portion that extends parallel to the first linear part, such that the first dipole element comprises a U-shape.

18. The card-type wireless communication device according to claim 17, wherein a distance between the first linear part and the portion of the first connecting part extending parallel to the first linear part is larger than the distance between the first linear part and the first outer side edge of the coil antenna.

19. The card-type wireless communication device according to claim 15, wherein the first dipole element has a first open end side that extends from the first open end in an X direction that is parallel to the first outer side edge of the coil antenna, and the second dipole element has a second open end side that extends from the second open end in a Y direction that is perpendicular to the X direction in the planar view of the base, such that the second open end side extends parallel to a second outer side edge of the coil antenna.

20. The card-type wireless communication device according to claim 15, wherein the second dipole element has a second linear part extending from the second connection end and parallel to the first outer side edge of the coil antenna, and the second open end of the second dipole element is facing the first outer side edge of the coil antenna in the planar view of the base.

* * * * *